(12) United States Patent
Tom et al.

(10) Patent No.: US 7,625,434 B2
(45) Date of Patent: Dec. 1, 2009

(54) ENHANCED OBIGGS

(75) Inventors: Robert Tom, Redondo Beach, CA (US); Jenny Gu, San Gabriel, CA (US); Ryan Murphy, Hermosa Beach, CA (US); Benjamin Tang, San Gabriel, CA (US)

(73) Assignee: Honeywell International Inc., Morristown, NJ (US)

( * ) Notice: Subject to any disclaimer, the term of this patent is extended or adjusted under 35 U.S.C. 154(b) by 455 days.

(21) Appl. No.: 11/531,246

(22) Filed: Sep. 12, 2006

(65) Prior Publication Data

US 2008/0060523 A1    Mar. 13, 2008

(51) Int. Cl.
*B01D 53/22* (2006.01)
*B64D 37/00* (2006.01)

(52) U.S. Cl. .......................................... 96/4; 244/135 R

(58) Field of Classification Search ........................ 96/4, 96/109–111; 95/1, 8, 12, 23, 54; 244/135 R
See application file for complete search history.

(56) References Cited

U.S. PATENT DOCUMENTS 4,421,529 A * 12/1983 Revak et al. ................... 95/54
4,560,394 A   12/1985 McDonald et al.
4,681,602 A *  7/1987 Glenn et al. ................... 95/47
4,857,082 A *  8/1989 DiMartino et al. ............ 95/19
5,069,692 A * 12/1991 Grennan et al. ................ 96/4
5,649,995 A *  7/1997 Gast, Jr. ....................... 95/12
6,491,739 B1  12/2002 Crome et al.
6,705,092 B1 *  3/2004 Zhou et al. ..................... 62/87
6,913,636 B2 *  7/2005 Defrancesco et al. ............ 95/8
7,048,231 B2   5/2006 Jones
7,273,507 B2 *  9/2007 Schwalm ..................... 55/467
2003/0233936 A1 * 12/2003 Crome ......................... 95/96
2004/0025507 A1   2/2004 Leigh et al.
2005/0103193 A1 *  5/2005 Lyons et al. .................... 95/54
2005/0279208 A1  12/2005 Schwalm
2006/0021652 A1   2/2006 Surawski
2006/0185514 A1 *  8/2006 Schwalm et al. ................ 96/4
2007/0023577 A1 *  2/2007 Jones ....................... 244/135 R

* cited by examiner

*Primary Examiner*—Frank M Lawrence
(74) *Attorney, Agent, or Firm*—Oral Caglar, Esq.

(57) ABSTRACT

A gas generating system comprises an air separation module (ASM) in fluid communication with a nitrogen enriched air (NEA) line and an oxygen enriched air (OEA) line. A valve is positioned in the OEA line and an oxygen sensor is positioned in the NEA line. The valve can be modulated in response to the oxygen sensor to create a backpressure forcing more airflow into the NEA line. The OEA line can be backpressured until a predetermined NEA oxygen concentration is reached.

16 Claims, 5 Drawing Sheets

ND OBIGGS

CROSS-REFERENCE TO RELATED APPLICATION

The present invention is related to U.S. patent application Ser. No. 10/358,774, filed Feb. 3, 2003; and is incorporated herein by reference.

BACKGROUND OF THE INVENTION

The present invention generally relates to gas generating systems and, more particularly, to On Board Inert Gas Generating Systems (OBIGGS).

Aircraft have used OBIGGS to protect against fuel tank explosions by replacing the potentially explosive fuel vapor/air mixture above the fuel in the ullage space of the tanks with nitrogen enriched air (NEA). The OBIGGS passes air (e.g. bleed air) through an air separation module (ASM), generating the NEA and a stream of oxygen enriched air (OEA). The resulting NEA can be used to inert fuel tanks while the OEA can be vented overboard. Various methods for improving the efficiency of OBIGGS have been described.

In U.S. Pat. No. 6,491,739 an OBIGGS having a fast warm up feature is disclosed. The described system uses a valve, referred to as a Fast Start Valve, to assist in warming up the ASM during start up conditions. The '739 patent also uses a modified ASM. The ASM modification involves adding an inlet port to the OEA side of the ASM. This modification enables use of the Fast Start Valve. The Fast Start Valve introduces either warm bleed air or NEA into the OEA inlet port thus warming up the ASM faster. The OEA is vented overboard through the "normal" OEA vent port. Although the described system may reduce the delay in reaching optimum operating temperatures for permeable membrane (PM) based systems, greater NEA generating efficiency and improved OBIGGS are still needed.

Another OBIGGS is disclosed in U.S. Pat. No. 7,048,231. The described system uses a turbine driven compressor to increase engine bleed air pressure to generate the NEA. The turbine expands the NEA, which produces the power to drive the compressor. The OEA is vented to the ram air circuit through a check valve. The check valve is used to prevent back-flow of air from the ram air circuit. For applications requiring greater NEA production, the '231 patent boosts the system flow by using a "co-axial boost motor" and/or bleed air from the high-pressure segment of the aircraft's Air Cycle Machine (ACM). Although the increased inlet air pressure may improve NEA production, operating a boost motor and/or tapping into the aircraft's ACM reduce aircraft efficiency.

Another OBIGGS has been disclosed in U.S. Patent Application No. 2006/0021652. The described OBIGGS uses a modulating valve at the NEA outlet. The modulating valve is used to vary the NEA flow so as to minimize the changes to the oxygen content within the fuel tank. As the modulating valve closes, the NEA oxygen concentration decreases and OEA flow increases and vice versa as the valve opens. The OEA is vented overboard through the ram air circuit. The modulating valve in the NEA stream is used to control NEA production. The amount of NEA required is based upon a desired flow, which is calculated based on a number of factors, including fuel tank pressure, temperature, and oxygen concentration. The objective is to minimize either the fuel tank oxygen concentration or to minimize the changes to oxygen concentration. The described system also includes an ejector and an ejector shutoff valve in the OEA duct. The ejector and shutoff valve admits high-pressure air bleed air into the OEA duct. This effectively reduces the pressure at the OEA port and increases OEA flow and decreases the NEA flow and NEA oxygen concentration thereby enhancing NEA purity, (lower NEA oxygen concentration). The shut-off valve is used to turn off the ejector when NEA enhancement is not required. Use of the ejector can only decrease the NEA flow and reduce NEA oxygen concentration. Additionally, the ejector's use of bleed air reduces aircraft efficiency. The described system does not have the ability to directly control NEA oxygen concentration or to increase NEA flow.

As can be seen, there is a need for improved gas generating systems. In some situations, the production of NEA is not sufficient to produce an inert atmosphere. Under these situations, one would normally increase the inlet airflow, inlet pressure, or inlet temperature, or a combination of the three. However, when these options are not available, a need arises to improve the nitrogen generating efficiency of the ASM.

SUMMARY OF THE INVENTION

In one aspect of the present invention, a gas generating system comprises at least one air separation module; a nitrogen enriched air line in flow communication with the air separation module; an oxygen enriched air line in flow communication with the air separation module; a modulating valve positioned in the oxygen enriched air line; and at least one sensor operationally connected to the modulating valve.

In another aspect of the present invention, a turbine engine gas generating system comprises an air separation module assembly; an oxygen enriched air line in flow communication with the air separation module assembly; a valve positioned in the oxygen enriched air line; a ram air duct in fluid communication with the oxygen enriched air line; and a fan positioned in the ram air duct.

In a further aspect of the present invention, a gas generating system comprises at least one air separation module; an inlet line in flow communication with the air separation module; a nitrogen enriched air line in flow communication with the air separation module; an oxygen enriched air line in flow communication with the air separation module; a modulating valve positioned in the oxygen enriched air line; and a sensor positioned in the nitrogen enriched air line.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides gas generating systems and methods for using the same. Embodiments of the present invention may find beneficial use in industries such as the automotive, electricity generation and aerospace industries. Embodiments of the present invention may be useful in applications including inerting fuel tanks and other compartments, such as cargo holds. Embodiments of the present invention may be useful in any gas generating application including, but not limited to, OBIGGS.

In one embodiment, the present invention provides a gas generating system. Unlike the prior art, the systems of the present invention can include a modulating valve disposed in the OEA stream. By placing the modulating valve in the OEA stream, a backpressure can be created thereby forcing more airflow into the NEA stream. The valve in the OEA stream can be modulated in response to an oxygen sensor positioned in the NEA stream. The OEA stream can be backpressured until a predescribed NEA oxygen concentration is reached, for example 9% or 12% $O_2$. This is unlike the prior art that includes a valve in the NEA stream to reduce the fuel tank oxygen concentration. Unlike the prior art NEA stream valve, the OEA stream valve of the present invention can increase NEA flow production. Additionally, unlike the prior art that includes an ejector in the OEA duct to reduce pressure at the OEA port, embodiments of the present invention can include a fan in the ram air duct to reduce pressure at the OEA outlet.

Figure 1:
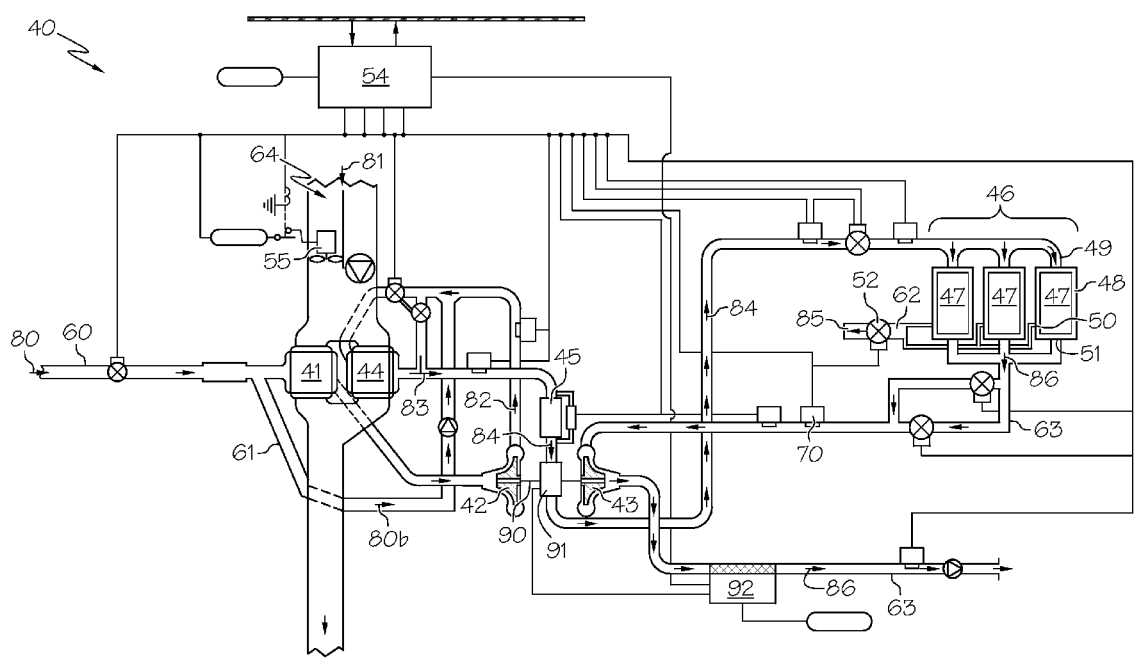
FIG. 1 is a diagram of a gas generating system according to one embodiment of the present invention.

Embodiments of the present invention may include a gas generating system 40, as depicted in FIG. 1. The system 40 can include a precooler heat exchanger 41, a compressor 42, a turbine 43, a main heat exchanger 44 (OBIGGS heat exchanger), a filter 45, an air separation module assembly 46 (ASM assembly), an oxygen enriched air line 62 (OEA line), and a nitrogen enriched air line 63 (NEA line). A valve 52 may be positioned in the OEA line 62. For some embodiments, an oxygen sensor 70 may be positioned in the NEA line 63. The valve 52 may be modulated in response to the oxygen sensor 70.

The system 40 may include an inlet line 60 designed to receive a supply of inlet flow 80 and to direct the supply of inlet flow 80 towards the precooler heat exchanger 41. The inlet line 60 may include any line upstream from and in flow communication with the ASM assembly 46. The supply of inlet flow 80 may include engine bleed air, ambient air, cabin recirculated air and others. For some applications, the inlet line 60 may direct the inlet flow 80 towards the precooler heat exchanger 41 and direct a bypass flow 80b (a portion of the inlet air flow 80) through a compressor bypass line 61 such that the bypass flow 80b bypasses the precooler heat exchanger 41 and the compressor 42.

The precooler heat exchanger 41 may be positioned in thermal contact with a ram air duct 64. A ram air flow 81 flowing through the ram air duct 64 may cool the inlet flow 80. The supply of inlet flow 80 from the precooler heat exchanger 41 may be directed towards the compressor 42.

The compressor 42 may be adapted to receive the inlet flow 80 from the precooler heat exchanger 41. The compressor 42 may pressurize the inlet flow 80 to provide a supply of compressed flow 82. For some applications, the compressor 42 may be driven by the turbine 43 (a turbo compressor). The turbo compressor may be operationally connected to the NEA line 63 and to the inlet line 60. The turbine 43 may be operationally connected to the compressor 42 by a shaft 90. The turbine 43 may be downstream from the ASM assembly 46 via the NEA line 63, and may be driven by a supply of nitrogen enriched air flow 86 (NEA flow) (discussed below). For some applications, a motor 91 may be operationally connected to the compressor 42 to provide additional energy input, as needed, to drive the compressor 42. Useful turbo compressors may include the turbo compressors described in U.S. Pat. No. 4,560,394 and U.S. Patent Application No. 2004/0025507, both of which are incorporated herein by reference. The compressed flow 82 from the compressor 42 may be directed to the main heat exchanger 44 (OBIGGS heat exchanger).

The OBIGGS heat exchanger 44 may be in fluid communication with the compressor 42 and the compressor bypass line 61. The OBIGGS heat exchanger 44 may be in thermal contact with the ram air flow 81. The OBIGGS heat exchanger 44 may receive the compressed flow 82 from the compressor 42 and receive the bypass flow 80b from the compressor bypass line 61. The OBIGGS heat exchanger 44 may cool the compressed flow 82 and the bypass flow 80b to provide a supply of cooled flow 83. The cooled flow 83 may be directed towards the filter 45.

The filter 45 may be positioned downstream from and in fluid communication with the OBIGGS heat exchanger 44. The filter 45 may be adapted to receive the cooled flow 83 from the OBIGGS heat exchanger 44. The filter 45 may be designed to remove particulate contaminants, moisture, dust and the like from the cooled flow 83 to provide a supply of conditioned flow 84. For some applications, the conditioned flow 84 may be in thermal contact with the motor 91 and may cool the motor 91. The filter 45 may be positioned upstream from and in fluid communication with the ASM assembly 46.

The ASM assembly 46 may be designed to receive the supply of conditioned flow 84. The ASM assembly 46 may be designed to provide a supply of oxygen enriched air flow 85 (OEA flow) to the OEA line 62 and to provide the NEA flow 86 to the NEA line 63.

The ASM assembly 46 may comprise at least one air separation module 47 (ASM). The ASM assembly 46 depicted in FIG. 1 includes three ASMs 47, for example. The number of ASMs 47 may vary and may depend on factors including the composition of the inlet flow 80, dimensional limitations of the system 40, the desired flow rate of the NEA flow 86, and the particular application of the system 40. For example, for some aircraft fuel tank inerting applications that use bleed air for inlet flow 80, there may be about three ASMs 47 when an NEA flow rate of about 6.00 lb/m is desired. For some aircraft applications, the ASM assembly 46 may comprise between about 1 and about 20 ASMs 47 depending on the amount of NEA desired.

The ASM 47 can include an ASM housing 48 having an ASM inlet 49, a first outlet 50 (OEA outlet) and a second outlet 51 (NEA outlet). The ASM inlet 49 may be adapted to receive the supply of conditioned flow 84. The OEA outlet 50 may be adapted to discharge the OEA flow 85 to the OEA line 62. The NEA outlet 51 may be adapted to discharge the NEA flow 86 to the NEA line 63. The ASM inlet 49 may be positioned at one end of the ASM housing 48, the NEA outlet 51 may be positioned at the opposite end of the ASM housing 48 and the OEA outlet 50 may be positioned on a side of the ASM housing 48. In other words, for some applications, the OEA outlet 50 may be positioned downstream from the ASM inlet 49 and positioned upstream from the NEA outlet 51.

The ASM 47 may be based on permeable membrane (PM) technology. The ASM 47 may include a bundle of hollow fiber membranes (not shown) positioned within the ASM housing 48. The conditioned flow 84 may enter the ASM housing 48 through the ASM inlet 49 and pass through the bundle of hollow fiber membranes. Oxygen may be separated from the conditioned flow 84 due to diffusion through the fiber walls because the fiber walls may be more permeable to oxygen than to nitrogen. As the conditioned flow 84 travels through the ASM 47, the NEA flow 86 may be generated by the loss of oxygen via permeation through the fiber wall. In other words, the conditioned flow 84 may be separated into the OEA flow 85 and the NEA flow 86 by passing through the hollow fiber membranes. The NEA flow 86 may exit the ASM housing 48 through the NEA outlet 51 and enter the NEA line 63. The OEA flow 85 may exit the ASM housing 48 through the OEA outlet 50 and enter the OEA line 62.

The NEA flow 86 from the ASM assembly 46 may enter the NEA line 63. The NEA line 63 may be adapted to direct the NEA flow 86 to a compartment in need of inerting, such as a fuel tank 93 (see FIGS. 2*a-c*). For applications having a turbo compressor, the NEA line 63 may be adapted to direct the NEA flow 86 from the ASM assembly 46 to the turbine 43 and adapted to direct the NEA flow 86 from the turbine 43 to the fuel tank 93. In other words, the NEA line 63 may provide for fluid communication between the turbine 43 and the fuel tank 93. The turbine 43 may extract energy from the NEA flow 86 to drive the compressor 42. The turbine 43 may thus reduce the temperature and pressure of the NEA flow 86 before entering the fuel tank 93. For some applications, the NEA line 63 may be in thermal contact with a motor controller 92 to cool the motor controller 92. The motor controller 92 may be designed to control the motor 91.

The OEA flow 85 from the ASM assembly 46 may enter the OEA line 62. The OEA line 62 may be adapted to either recapture the OEA flow 85 or to exhaust the OEA flow 85 overboard. The OEA flow 85 can be exhausted overboard by venting the OEA flow 85 through the ram air duct 64. The pressure differential between the ASM inlet 49 and the OEA outlet 50 may be used to drive the system 40. For some applications, a fan 55 may be positioned in the ram air duct 64 to increase the ram air flow 81. The fan 55 may be an electrically driven fan and may increase the momentum of the ram air flow 81. The increased momentum of the ram air flow 81 may produce a low-pressure region at the ram air duct/OEA line interface. The low-pressure region may provide the pressure drop that drives the conditioned flow 84 through the ASM assembly 46 and into the OEA line 62. A reduction in pressure at the OEA outlet 50 may increase the OEA flow 85. Operation of the fan 55 may provide additional cooling to the precooler heat exchanger 41 and the OBIGGS heat exchanger 44. The OEA flow 85 may be controlled by the valve 52.

The valve 52 may be disposed within the OEA line 62. The valve 52 may comprise a modulating valve. For some applications, the valve 52 may be electrically operated. For some applications, the valve 52 may be electro-pneumatically operated.

The valve 52 may be set to create a backpressure in the OEA line 62, so as to force more flow into the NEA line 63 thereby increasing the NEA flow 86. As the NEA flow 86 increases, the oxygen concentration of the NEA flow 86 may increase (resulting in decreased nitrogen purity). The valve 52 can be used to control the flow rate of the NEA flow 86 in an inverse relationship to the nitrogen purity of the NEA flow 86. The flow rate of the OEA flow 85 can be increased or decreased by modulating the valve 52. For fixed inlet conditions at ASM 47, as the flow rate of the OEA flow 85 decreases, the flow rate of the NEA flow 86 increases and vice versa. Because the nitrogen purity of the NEA flow 86 may be inversely proportional to the flow rate of the NEA flow 86, a desired maximum oxygen concentration of the NEA flow 86 can be maintained in order to maximize NEA flow. For example, the oxygen sensor 70 (discussed below) may be positioned in the NEA flow 86. If the oxygen concentration of the NEA flow 86 is for example 3%, the oxygen sensor 70 can trigger the valve 52 to restrict the OEA flow 85 so as to force more flow into the NEA line 63. This may increase the flow rate of the NEA flow 86 and increase the oxygen concentration of the NEA flow 86. As the oxygen concentration of the NEA flow 86 approaches a preset value, for example 9%, the oxygen sensor 70 can trigger the valve 52 to allow more flow into the OEA line 62, reducing both the flow rate of the NEA flow 86 and the oxygen concentration of the NEA flow 86.

The valve 52 can be modulated in response to readings provided by at least one sensor. As used herein, sensor is a generic term. Useful sensors may include the oxygen sensor 70 and a flow sensor 71 (see FIG. 3*b*). The oxygen sensor 70 may be designed to provide oxygen concentration readings and the flow sensor 71 may be designed to provide flow rate readings. The valve 52 may be operationally connected to the sensor(s) (oxygen sensor 70 and/or flow sensor 71) via an On Board Inert Gas Generating System controller 54 (OBIGGS controller). The OBIGGS controller 54 may be a computer or a microprocessor that can analyze the operating parameters of the system 40 and, in response, initiate appropriate actions.

Figure 2A:
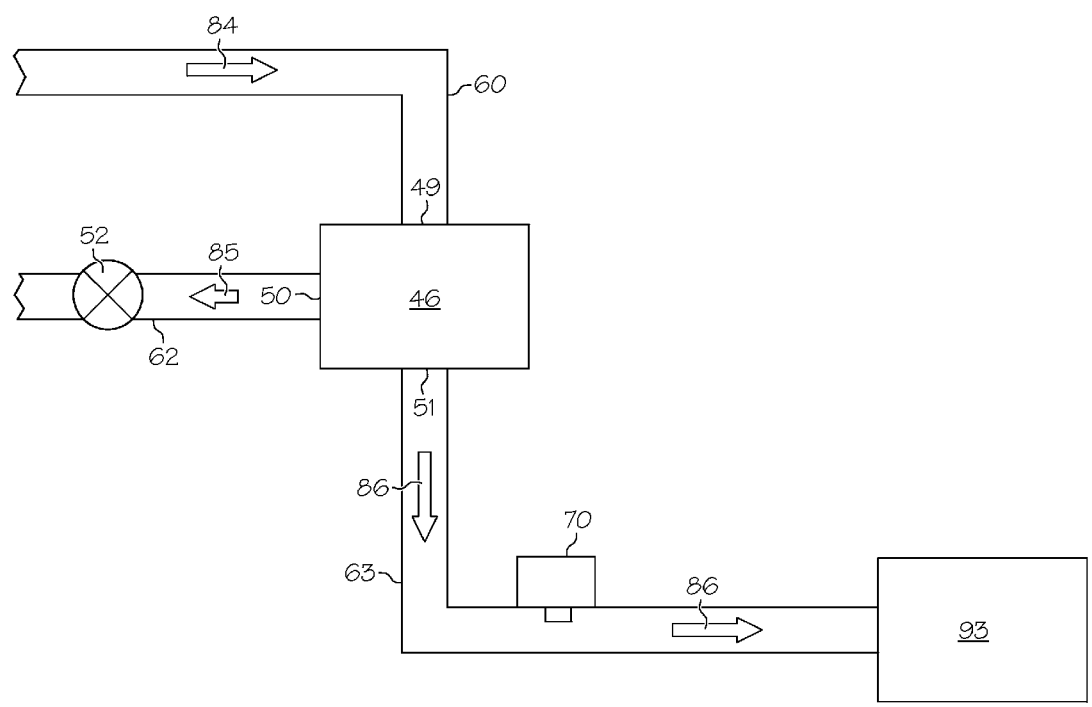
FIG. 2a is a diagram of a sensor arrangement according to one embodiment of the present invention.

For some applications, as depicted in FIGS. 1 and 2*a*, the sensor may comprise the oxygen sensor 70 positioned in the NEA line 63. For these applications, the OEA line 62 can be backpressured until a predefined oxygen concentration of the NEA flow 86 is reached, for example 9% or 12% $O_2$.

Figure 2B:
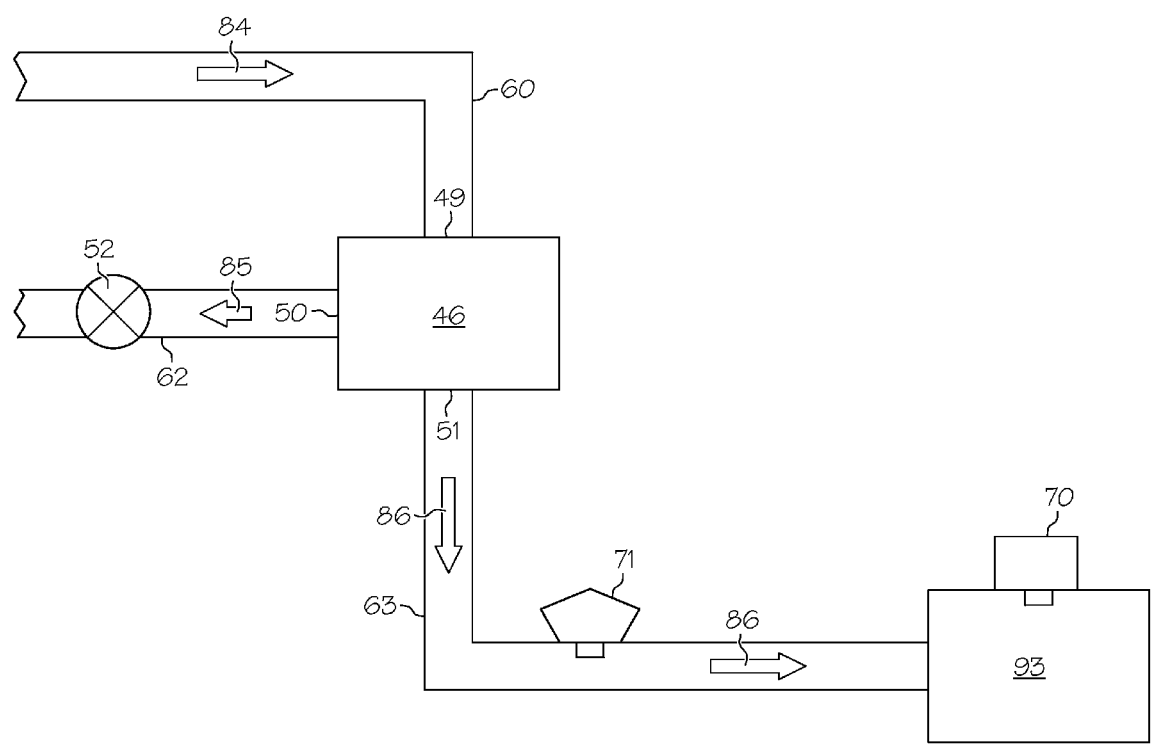
FIG. 2b is a diagram of a sensor arrangement according to another embodiment of the present invention.

An alternate OEA valve control method, as depicted in FIG. 2*b*, may be applied for applications where the amount of NEA flow 86 is more critical than the oxygen concentration of the NEA flow 86. The requirement for commercial aerospace applications is to statistically show that no greater than about 3% of the fleet fails to meet the fuel tank ullage flammability requirement of no greater than about 12% $O_2$ concentration. The actual fuel tank oxygen concentration is a function of the amount of air allowed to enter the fuel tank 93 during aircraft descent and by the oxygen concentration of the NEA flow 86. Under these circumstances, the system 40 can include two sensors. The first sensor can comprise the oxygen sensor 70 placed in the fuel tank 93 and the second sensor can comprise the flow sensor 71 placed in the NEA line 63. The valve 52 can then be controlled by both the oxygen sensor 70 and the flow sensor 71 in order to control the amount of air entering the fuel tanks during descent.

Figure 2C:
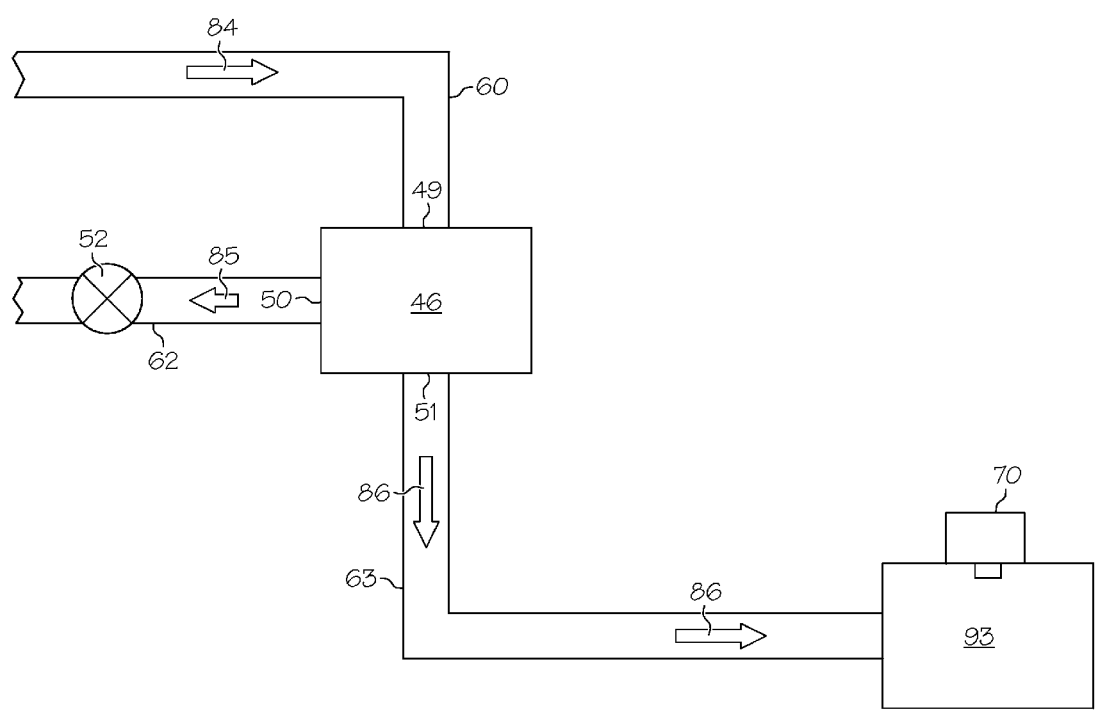
FIG. 2c is a diagram of a sensor arrangement according to another embodiment of the present invention.

Another alternate OEA valve control method, as depicted in FIG. 2*c*, may be applied for applications where climb/dive valves (not shown) are used to prevent air from entering the fuel tank 93. In this case, oxygen evolution from fuel and NEA oxygen concentration both contribute to the fuel tank oxygen concentration. Under this circumstance, the sensor can be the oxygen sensor 70 placed in the fuel tank 93. The valve 52 can then be controlled by the oxygen sensor 70 in the fuel tank 93 to provide sufficient NEA flow 86 to reduce the effects of oxygen evolution.

Figure 3:
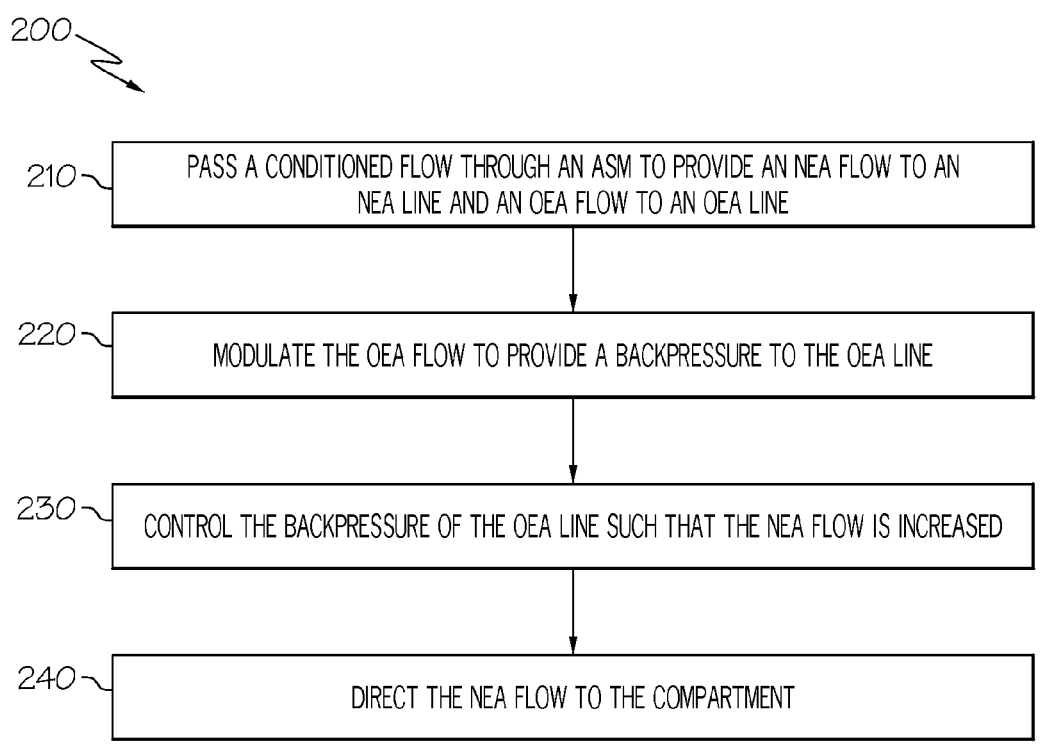
FIG. 3 is a flow chart of a method of providing a nitrogen enriched air flow to a compartment according to an embodiment of the present invention.

A method 200 of providing a nitrogen enriched air flow to a compartment, such as a fuel tank or a cargo hold, is depicted in FIG. 3. The method 200 may comprise a step 210 of passing a conditioned flow 84 through an ASM 47 to provide an NEA flow 86 to an NEA line 63 and an OEA flow 85 to an OEA line 62; a step 220 of modulating the OEA flow 85 to provide a backpressure to the OEA line 62; a step 230 of controlling the backpressure of the OEA line 62 such that the NEA flow 86 is increased; and a step 240 of directing the NEA flow 86 to the compartment. The step 220 of modulating the OEA flow 85 to provide a backpressure to the OEA line 62 may comprise modulating the OEA flow 85 with a valve 52 positioned in the OEA line 62. The step 230 of controlling the backpressure may comprise controlling the valve 52 with an oxygen sensor 70 positioned in the NEA line 63.

As can be appreciated by those skilled in the art, the present invention provides improved gas generating systems. Embodiments of the present invention can provide gas generating systems having increased NEA flow without the need for increasing the pressure, flow rate, input power, and/or temperature of the inlet flow. Embodiments of the present invention can include a modulating valve in the OEA duct to increase the production of NEA, while minimizing bleed flow and input power consumption.

It should be understood, of course, that the foregoing relates to exemplary embodiments of the invention and that modifications may be made without departing from the spirit and scope of the invention as set forth in the following claims.

We claim:

1. A gas generating system comprising:
   at least one air separation module;
   a nitrogen enriched air line in flow communication with said air separation module;
   an oxygen enriched air line in flow communication with said air separation module;
   a modulating valve positioned in said oxygen enriched air line;
   at least one sensor operationally connected to said modulating valve; and
   a fuel tank in fluid communication with said nitrogen enriched air line;
   wherein the at least one sensor comprises an oxygen sensor positioned in said fuel tank.

2. The system of claim 1, wherein said sensor comprises a flow sensor.

3. The system of claim 1, further comprising a turbine in fluid communication with said nitrogen enriched air line.

4. The system of claim 3, further comprising a compressor operationally connected to said turbine.

5. The system of claim 4, further comprising a motor operationally connected to said compressor.

6. The system of claim 1, further including an On Board Inert Gas Generating System controller operationally connected to said sensor and said valve.

7. The system of claim 1, wherein said at least one sensor comprises a first sensor and a second sensor, said first sensor comprises an oxygen sensor positioned in said fuel tank and said second sensor comprises a flow sensor positioned in said nitrogen enriched air line.

8. A turbine engine gas generating system comprising:
   an air separation module assembly;
   an oxygen enriched air line in flow communication with said air separation module assembly;
   a valve positioned in said oxygen enriched air line;
   a ram air duct in fluid communication with said oxygen enriched air line; and
   a fan positioned in said ram air duct.

9. The system of claim 8, further comprising:
   a nitrogen enriched air line in flow communication with said air separation module assembly; and
   an oxygen sensor positioned in said nitrogen enriched air line.

10. The system of claim 9, further comprising a turbo compressor operationally connected to said nitrogen enriched air line.

11. The system of claim 9, wherein said valve is modulated in response to said oxygen sensor.

12. A gas generating system comprising:
    at least one air separation module;
    an inlet line in flow communication with said air separation module;
    a motor in thermal contact with said inlet line;
    a nitrogen enriched air line in flow communication with said air separation module;
    an oxygen enriched air line in flow communication with said air separation module;
    a modulating valve positioned in said oxygen enriched air line; and
    a sensor positioned in said nitrogen enriched air line.

13. The system of claim 12, further comprising a filter in fluid communication with said inlet line.

14. The system of claim 12, wherein said sensor comprises an oxygen sensor operationally connected to said modulating valve.

15. The system of claim 12, further comprising a motor controller in thermal contact with said nitrogen enriched air line.

16. The system of claim 12, further comprising a turbo compressor operationally connected to said nitrogen enriched air line and said inlet line.

* * * * *

UNITED STATES PATENT AND TRADEMARK OFFICE
CERTIFICATE OF CORRECTION

PATENT NO. : 7,625,434 B2 Page 1 of 1
APPLICATION NO. : 11/531246
DATED : December 1, 2009
INVENTOR(S) : Tom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 535 days.

Signed and Sealed this

Second Day of November, 2010

David J. Kappos
*Director of the United States Patent and Trademark Office*